George B. Loper
Robert R. Pittman
INVENTOR.

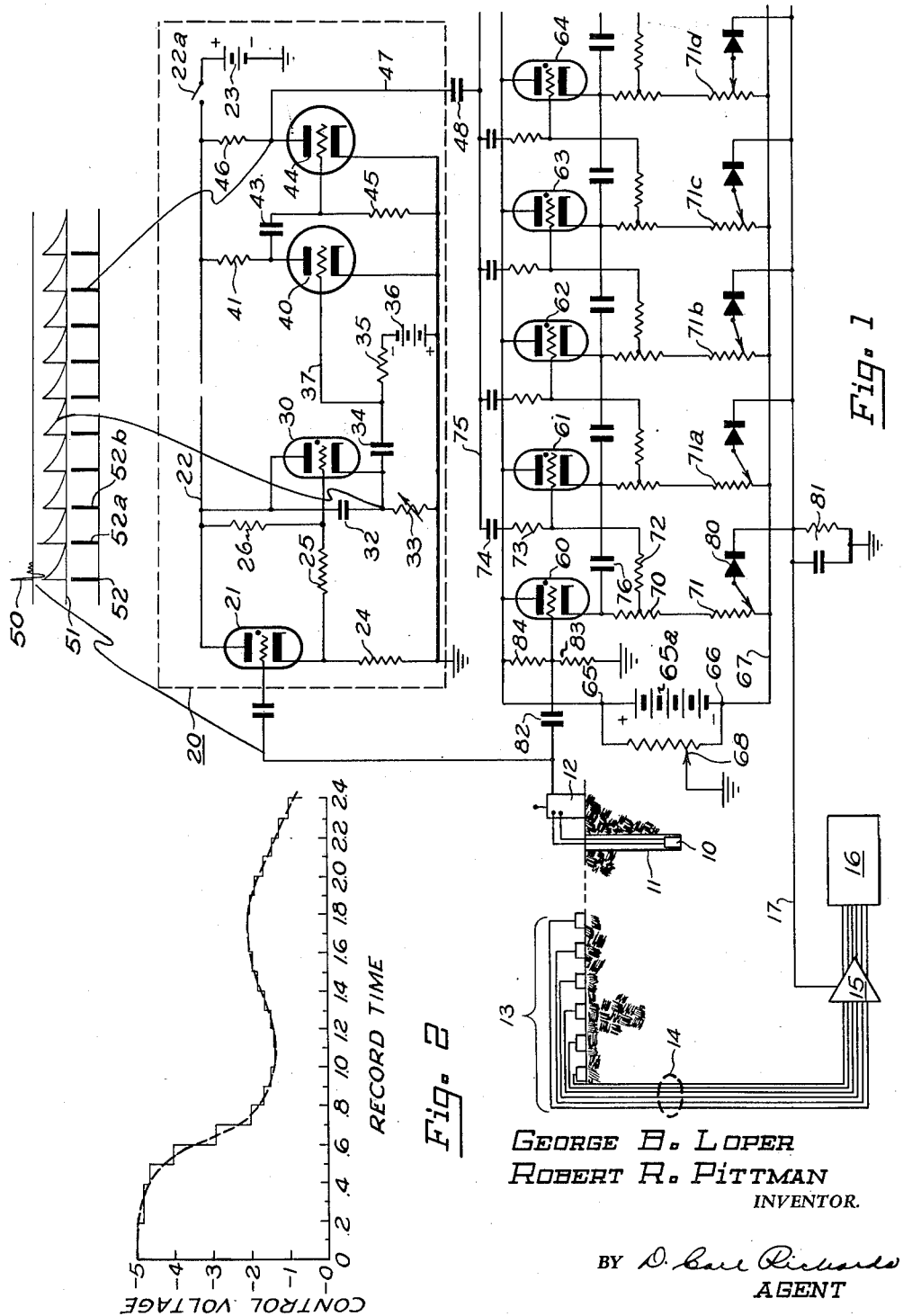

United States Patent Office 2,765,403
Patented Oct. 2, 1956

2,765,403

CONDUCTION TRANSFER PRODUCTION OF CONTROL VOLTAGE FUNCTIONS

George B. Loper and Robert R. Pittman, Dallas, Tex., assignors, by mesne assignments, to Socony Mobil Oil Company, Inc., a corporation of New York Application August 18, 1952, Serial No. 305,046

9 Claims. (Cl. 250—27)

This invention relates to the generation of a voltage which varies as a predetermined function of time, and more particularly to a conduction transfer system responsive to periodically recurring control pulses for establishing in sequence at a plurality of impedances, voltage levels that may be preadjusted in magnitude and which appear in an output circuit common to all of said impedances. In a further aspect of the invention, the gain of an amplifier is controlled in a predetermined manner by producing across each of a plurality of impedances in a gain control circuit discrete time portions of a control voltage having a predetermined time-amplitude characteristic.

The invention is particularly useful in seismic prospecting systems in which the variation in the energy level of received seismic waves is compensated by a concurrent variation in the gain of a receiving system, and for that reason this description will at least in part be directed to such an application. In seismic exploration an explosive charge located at a shot point is detonated to produce seismic waves which are reflected or refracted from interfaces below the earth's surface. The reflected or refracted waves are attenuated in their travel through the earth strata. In reflection seismograph procedures the deeper the interface the lower the amplitude of the reflected waves although, of course, the contrast in the acoustic transmission properties of formations adjacent an interface also plays a dominant part in determining the amplitude of reflected waves. Automatic volume control systems and systems in which the gain is controlled as a function of time following the generation of seismic waves have been utilized in an effort to provide signal traces on a photographic record or seismogram, whose average amplitude is substantially constant. The present invention may be applied to produce a generally similar result but readily provides a much wider range of control than prior art methods.

In accordance with the present invention there is provided a conduction transfer circuit for producing at output terminals a voltage which changes from one predetermined level to another in response to control pulses. The circuit comprises a source of potential having a terminal that is positive and a terminal that is negative with respect to one of a pair of output terminals. A plurality of circuits are connected in a shunting circuit relation to the source of potential, each shunting circuit including in series a gas discharge triode and resistance means connected to the cathode of the triode and to the negative terminal of the source of potential. By way of a common circuit the control pulses simultaneously are applied to the control grids of all of the triodes. Voltages on the control grids of the triodes are determined by a D. C. path connected to a high potential point on the cathode resistance of one tube and the control grid of an adjacent tube. Upon conduction in one tube the control grid of an adjacent tube is raised to a potential sufficiently positive to permit initiation of conduction upon application of a succeeding control pulse. Capacitance means connected between cathodes of the triodes provide a discharge for extinguishing a conducting triode when conduction is initiated in an adjacent triode. Unilaterally conductive circuits adjustably connected to the resistances deliver to the second of the output terminals a voltage which by the adjustable means will follow any single valued predetermined function of time.

For a more complete description of the present invention and for further objects and advantages thereof, reference may now be had to the following description taken in conjunction with the accompanying drawings in which:

Fig. 1 schematically illustrates a seismic prospecting system incorporating the present invention;

Fig. 2 is a plot of a voltage function; and

Figure 3:
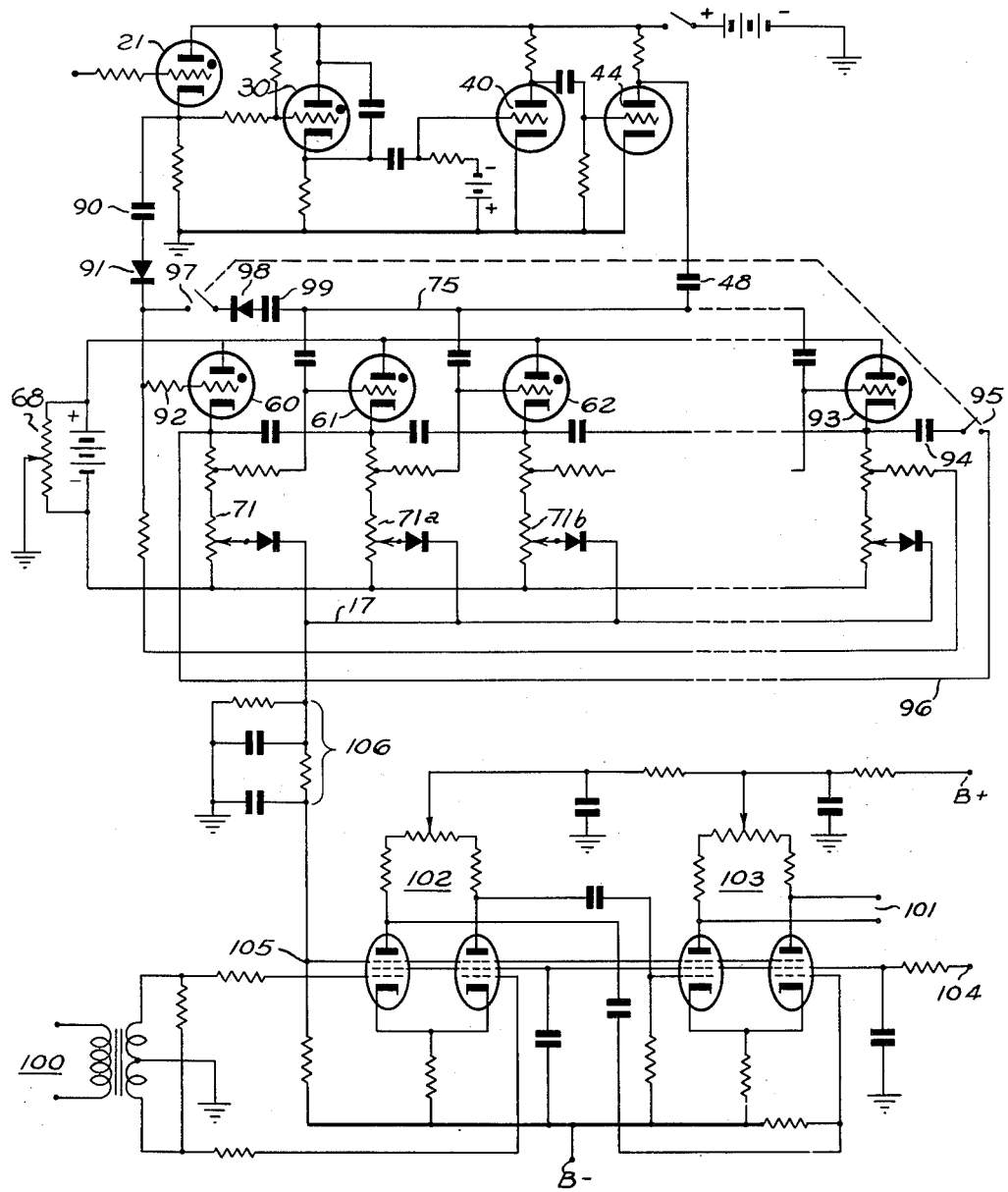
Fig. 3 is a more detailed circuit diagram of the invention.

Referring first to Fig. 1, there is illustrated an explosive charge 10 positioned in a shot hole 11. Electrical conductors extending up the bore hole are terminated in a blasting device 12 which upon actuation causes detonation of explosive charge 10 to produce seismic waves which travel to subsurface beds where they are reflected back to the earth's surface. A plurality of detectors forming a spread 13 are positioned in a spaced apart relation one from another and from the shot point 11 for detecting the seismic waves. Conductor means forming a cable 14 connect the detectors in spread 13 to a bank of amplifiers 15. The output voltages from the amplifier bank 15 are applied to a multi-element recorder 16 to produce a permanent record of the seismic waves. The foregoing elements are commonly employed in seismic exploration. They are illustrated generically in Fig. 1 to illustrate one application of the invention.

In accordance with the invention, a voltage is produced and applied to the conductor 17 leading to the amplifier bank 15 which may be varied in accordance with any predetermined single valued function of time following the detonation of the explosive charge 10. For example as illustrated in Fig. 2, the voltage on conductor 17 may vary with time in the manner illustrated by the solid curve. The voltage variations as plotted form a step function varying from an arbitrarily assumed minus 5 volts to approximately minus 2 volts in the time from zero to 1 second and thereafter increase step-wise to approximately 3 volts at 1.8 seconds and then decrease thereafter. A smoothing network may be utilized to produce a smooth function illustrated by the dotted curve of Fig. 2, the latter being preferable for a smooth transition from one amplification level to another in the associated amplifiers 15.

A voltage varying as shown in Fig. 2 is produced by the conduction transfer circuit shown in Fig. 1 which from the standpoint of operation may be considered in two parts. The first is a controlled relaxation oscillator 20 which in Fig. 1 is enclosed within a dotted outline. The second is a switching circuit comprised of gaseous type tubes connected in tandem and forming the remaining part of the circuit of Fig. 1 and responsive to pulses from the circuit 20.

Consider first the operation of the relaxation oscillator 20. The input tube, a thyratron 21, is connected at its anode by way of conductor 22 and switch 22a to a source of potential such as the positive terminal of a battery 23. The negative terminal of battery 23 is connected to ground. Similarly, the cathode of tube 21 is connected through resistor 24 to ground. The cathode of tube 21 is also connected by way of resistor 25 to the control electrode of a second thyratron 30. The anode of thyratron 30 is connected to one terminal of conductor 22. Connected between the anode of tube 30 and the ground is an RC circuit including condenser 32 and resistor 33. The point intermediate condenser 32 and resistor 33 is connected directly to the cathode of tube 30 and to ground by way of condenser 34, resistor 35 and battery 36. The juncture of condenser 34 and resistor 35 is connected by way of conductor 37 to the grid of a vacuum triode 40 whose cathode is connected directly to ground and whose anode is connected by way of resistor 41 to the common B+ conductor 22. The anode of tube 40 is also connected by way of condenser 43 to the control grid of a second vacuum triode 44. The control grid is also connected to ground by way of resistor 45. The cathode of tube 44 is connected directly to ground and its anode is connected to the B+ bus 22 by way of resistor 46. The output of the relaxation oscillator system appearing at the anode of tube 44 is transmitted by way of conductor 47 and condenser 48 to the switching circuit.

In operation, switch 22a is closed prior to detonation of the explosive charge 10. Tubes 21 and 30 are non-conductive. Current flows from battery 23 through switch 22a and conductor 22 to charge condensers 32 substantially to the potential of the battery 23. Upon detonation of the explosive charge 10, a voltage change is produced from blaster 12 such as illustrated by the pulse 50. The latter pulse appears on the input grid of the thyratron 21 to initiate conduction therein. Immediately the cathode of tube 21 is raised to a more positive voltage level than when non-conducting. The voltage at the cathode of tube 21 then influences the control grid of tube 30. Resistors 24, 25 and 26 are so selected that when tube 21 is fired the tube 30 may also begin to conduct. Condenser 32 then discharges through tube 30 and its cathode-anode voltage is lowered below the value necessary to maintain conduction so that tube 30 is extinguished. Condenser 32 recharges and again initiates conduction through tube 30 to produce at the cathode of tube 30 voltage discontinuities uniformly repeated in time at a rate depending upon the time constant of the charging circuit for condenser 32. This time constant is determined by the relative magnitude of condenser 32 and resistor 33.

The voltage discontinuities on the cathode of tube 30 are differentiated by the condenser-resistor combination 34 and 35. The differentiated pulses illustrated by the graph 51 appearing on conductor 37 are amplified in tube 40 further differentiated by condenser-resistor combination 43—45 and amplified in tube 42 to appear at the anode of tube 42 substantially as square wave pulses such as illustrated by the curve 52. Such square wave pulses transmitted through condenser 48 to the switching circuit are utilized to initiate sequential operation of the tubes in the switching circuit. Resistor 33 may be selectively adjusted to produce output pulses at selected repetition rates. As will hereinafter appear, the control voltage appearing on conductor 17 may be made to change upon the occurrence of each of the output pulses from the relaxation oscillator 20.

The system utilizing such output pulses comprises a series of gaseous triodes, five of which, the tubes 60, 61, 62, 63 and 64, are shown in Fig. 1. The anodes of each of the tubes 60—64 are connected to the positive terminal 65 of a suitable voltage supply source 65a, such as a battery, whose negative terminal 66 is connected to a common bus 67. A potentiometer 68 is connected across terminals 65 and 66 and has its variable tap connected directly to ground.

The circuit components connecting the tubes 60—64 together to form a tandem connected circuit and operation thereof are identical except that the grid circuit of tube 60 differs from that of the grid circuits of the remaining tubes. The cathode of tube 60 is connected through tapped resistor 70 and potentiometer 71 to the cathode bus 67 which is connected to the negative terminal 66 of battery 65a. The tap on resistor 70 is connected through resistors 72, 73 and condenser 74 to an input bus 75 connected to the condenser 48 and receiving the output pulses 52 from the relaxation oscillator 20. The cathode of tube 60 is connected through condenser 76 to the cathode of tube 61.

The tap on the cathode potentiometer 71 of tube 60 is connected through a rectifier 80 to the output or control conductor 17. Conductor 17 is connected by way of the RC network 81 to ground.

As above noted, the grid circuit of tube 60 differs from grid circuits of the remaining tubes in the circuit, the latter all being identical. The control grid of tube 60 is connected through condenser 82 to the blaster 12. It is also connected by way of resistor 83 to ground and by way of resistor 84 to the positive terminal 65 of the voltage source.

In operation prior to detonation of explosive charge 10 and generation of pulse 50 by the blaster 12, all of the tubes 60—64 are non-conductive. In this state the cathode bus 67 is at a potential negative with respect to ground in an amount dependent upon the position of the variable tap on the potentiometer 68. For the purpose of the present discussion assume that the bus 67 is at a potential of minus 5 volts with respect to ground. This corresponds with the first part of the curve illustrated in Fig. 2.

Upon detonation of the explosive charge 10, pulse 50 is applied to the grid of tube 60 to fire it. The cathode of tube 60 is immediately driven to a more positive potential by reason of current flow through resistors 70 and 71. A positive voltage is thus applied through resistor 72 to the control grid of tube 61. In this state of operation tube 60 is conducting, and the control grid of tube 61 is at a potential more positive than either grids 62, 63 or 64. At a time thereafter, depending upon the time constant of the charging circuit for condenser 32, the second pulse 52a appears on the control bus 75 and is adjusted to be of sufficient level to fire tube 61 but is not of sufficient magnitude to fire tubes 62, 63 or 64. When tube 61 fires, its cathode is driven positive. Current flow through condenser 76 attempts to raise the level of the cathode of tube 60 to approximately twice its level when only tube 60 is conducting. This drives the cathode of tube 60 to such a positive potential that there is insufficient voltage between the cathode and anode to maintain conduction, and thus tube 60 is extinguished.

When tube 61 is conducting, the grid of tube 62 is at a potential more positive than the grids of tubes 63 or 64 and is thus susceptible of excitation by the next succeeding pulse, the pulse 52b, applied to the control bus 75.

In the foregoing manner, conduction is successively transferred from tube 60 to tube 61 and thence to tube 62 and so on throughout the entire circuit (for as many tubes as are included therein).

Output voltages for application to the amplifier bank 15 are derived from the potentiometers 71, 71a, 71b, 71c, 71d, etc. The voltage on conductor 17 is controlled successively by each of the tubes 60—64 as illustrated. Note that the potentiometers 71 and 71a are set to their maximum level so that the output voltage on conductor 17 during conduction in tubes 60 and 61 is minus 5 volts as illustrated in Fig. 2. When tubes 62 and 63 are conducting, the voltage is decreased somewhat by a lower setting of the potentiometers 71b and 71c. Assuming that resistor 33 is adjusted for the production of output pulses at the rate of 10 per second, a voltage of slightly less than 5 volts appears as shown in Fig. 2 in the interval between 0.2 and 0.4 second. Similarly when tube 64 is conducting, the voltage picked up from the potentiometer 71d is still lower as indicated in the interval 0.4 to 0.5 in Fig. 2.

The rectifier 80 and similar units associated with output resistors 71a–d are electrically common to the output circuit including conductor 17, and across each of the output resistors there is produced discrete time portions of the voltage having a preselected time-amplitude characteristic such as that illustrated in Fig. 2. The rectifiers, as unilaterally conductive circuit elements, prevent current flow in all but the one associated with a conducting tube and thus serve to isolate the conducting tube. Conduction is transferred from one tube to another in response to the control pulses so that between ground as one output terminal and the control bus 17 as the other output terminal the level of the output voltage is controlled by adjustment by the taps on the cathode potentiometers. The tubes 60—64 and their cathode impedances form parallel connected circuits across battery 65a. Between each of the tubes a pair of control circuits permits proper conduction transfer from one tube to another, serving to connect the tubes in tandem circuit relation.

It will be apparent that any number of tubes, such as tubes 60—64, may be connected in tandem. With the output potentiometers corresponding to potentiometers 71—71d selectively adjusted, any single valued voltage function may be produced on the control conductor 17. As indicated by Fig. 2, 24 tubes actuated successively at 0.1 second intervals would be necessary to produce this voltage function.

The voltage function illustrated in Fig. 2 has but one polarity and is suitable for application to amplifiers to control the gain thereof. If it is desired to have the polarity change, it may be preferable to substitute for the rectifier 80 and similar units a high impedance such as a resistor in the order of megohms to isolate the conducting tube from the non-conducting tubes. When such is the case, the output voltage on conductor 17 may be driven from one polarity to another for generation of functions more complex than the relatively simple curve illustrated in Fig. 2.

In Fig. 3 a circuit arrangement is illustrated which is particularly suitable for field operations providing for checking the control voltage appearing on the conductor 17. Where consistent, like parts have been given the same reference characters as in Fig. 1.

In this system the pulse for actuating tube 60 is derived from the cathode of tube 21 and is applied to the control grid of tube 60 by way of condenser 90, over rectifier 91 and resistor 92. Otherwise the operation is substantially the same as above described in connection with Fig. 1. Repeated control pulses are applied to the control bus 75 for sequentially shifting conduction from tube 60 to tubes 61, 62 and finally to the last tube of the circuit, tube 93. It will be apparent that as many tubes as desired may be inserted between tubes 62 and 93 for increasing the number of points that voltage may be changed during a given cycle of operations. The cathode of tube 93 is connected by way of condenser 94 to a switch 95. The second terminal of switch 95 is connected by way of conductor 96 to the cathode of tube 60. A second switch 97 has one terminal connected by way of resistor 92 to the control grid of tube 60 and the other terminal connected through a rectifier 98 and a condenser 99 to the control bus 75. When switches 95 and 97 are closed and control pulses are applied through condenser 48 to bus 75, the switching circuit including tubes 60, 61, 62—93 runs as a ring, the output from tube 92 firing tube 60.

Once conduction is initiated in the tubes 60—93 and so long as the oscillator including tubes 40 and 44 is in operation, a periodic voltage will be produced on the output conductor 17. The voltage may be made to have any desired shape so long as it is single valued. It may have positive values or negative values depending upon the relative settings of the grounded tap on the resistor 68 and the variable output taps on the cathode resistors 71, 71a, etc. Thus the system will be useful for simulating theoretical wave shapes for test studies as well as the gain controlling function illustrated in the detailed Fig. 3.

In applications where amplifier gain is controlled, a constant amplitude signal may be applied to the input terminals 100 of the amplifier illustrated in Fig. 3 and a recording or other viewing means connected to the output terminals 101. Cyclic variations of the gain control voltage applied to the two push-pull stages 102 and 103 and more particularly at the terminal 105 which is electrically common to all the suppressor grids in the stages 102 and 103, will modulate the signal applied to terminals 100 thereby graphically to display the wave form of the voltage at terminal 105. For smooth transition from one gain level to another in the amplifier, a smoothing network 106 may be utilized. Absent the filter network 106 the gain of the amplifier would follow abrupt step-like changes as conduction is transferred from one tube to another in the voltage generating circuit.

When switches 95 and 97 are closed and control pulses are applied to the control grids of all of the tubes, conduction is sequentially transferred from one tube to another around the ring. A cyclic voltage of predetermined wave-form is then generated by adjusting the taps on the cathode resistances to points which differ with respect to the ground or reference terminal in the same manner as points equal in number to the number of tubes in the circuit uniformly spaced one from the other in the cycle of the wave-form desired to be generated differ from zero in sign and in magnitude.

The foregoing illustrates operation and certain applications of the present invention. While the invention has been described in such detail as to permit one skilled in the art to make and use the same, it will be understood that further modifications may now suggest themselves to those skilled in the art, and it is intended to cover such modifications as fall within the scope of the appended claims.

What is claimed is:

1. A conduction transfer circuit for producing at output terminals a voltage which changes from one predetermined level to another in response to control pulses, which comprises a source of potential having a terminal which is positive and a terminal which is negative with respect to the potential of a first of said output terminals, at least two circuits connected in shunting relation to said source of potential and each including in series a resistance means connected to said negative terminal and a gas discharge tube including an anode connected to said positive terminals, a control grid and a cathode connected to said resistance means, an alternating current circuit common to the control grids for simultaneous application of said control pulses to said grids, a D. C. circuit connected between a high potential point on the resistance means of a first of said tubes and to the control grid of the second of said tubes thereby to raise the potential on the grid of said second tube when said first tube is conducting, capacitance means directly coupling said cathodes for discharge upon initiation of conduction in the second of said tubes to extinguish the first gas discharge tube, and high impedance paths each including variable means connected between each of said resistance means and the second of said output terminals for applying thereto selectable portions of the voltages across said resistance means.

2. In a transmission system for a signal which varies as a function of time, said system including an amplifier having terminals for application thereto of a gain control voltage, the combination which comprises a source of potential having a terminal which is positive and a terminal which is negative with respect to a first of said gain control terminals, at least two normally open circuits connected in parallel across said source each of which includes resistance means, means for closing a first of said parallel circuits at a first instant, unilaterally conductive circuit means connected to the resistance in the first parallel circuit and to the second of said gain control terminals and adapted to apply a selectable portion of the voltage across said last named resistance means to said gain control terminal to fix the gain of said amplifier at a first level following said first instant, means operative at a second instant for closing the second of said parallel circuits and for opening said first parallel circuit, and unilaterally conductive means connected to said second gain control terminal and adjustably connected to the resistance in said second parallel circuit for selectively applying a potential which is related to the potential taken from said first resistance inversely as said function at said second instant is related to said function at said first instant to change the level of said gain at said second instant inversely proportional to the change in said function in the interval between said instants.

3. In a transmission system for a signal which varies as a function of time following a zero instant, said system including an amplifier having terminals for application thereto of a gain control voltage, the combination which comprises a source of potential having a terminal which is positive and a terminal which is negative with respect to a first of said gain control terminals, at least two normally open circuits connected in parallel across said source each of which includes resistance means, means for closing a first of said parallel circuits at a first instant after said zero instant, unilaterally conductive circuit means connected to the resistance in the first parallel circuit and to the second of said gain control terminals and adapted to apply a selectable portion of the voltage across said last named resistance means to said gain control terminal to fix the gain of said amplifier at a first level following said first instant, means operative at a second instant after said zero instant for closing the second of said parallel circuits, capacitance means connected between said parallel circuits for opening said first parallel circuit upon closure of said second parallel circuit, and unilaterally conductive means connected to said second gain control terminal and adjustably connected to the resistance in said second parallel circuit for selectively applying a potential related to the potential taken from said first resistance inversely as said function at said second instant is related to said function at said first instant to change the level of said gain at said second instant inversely proportional to the change in said function in the interval between said instants.

4. In a transmission system for a signal which varies as a function of time, said system including an amplifier having terminals for application thereto of a gain control voltage, the combination which comprises a source of potential having a terminal which is positive and a terminal which is negative with respect to a first of said gain control terminals, at least two normally open circuits connected in parallel across said source each of which includes resistance means and gas discharge means, means coupled to said gas discharge means for initiating conduction in a first of said parallel circuits at a first instant, a unilaterally conductive circuit connected to the resistance in the first parallel circuit and to the second of said gain control terminals and adapted to apply a selectable portion of the voltage across said last named resistance means to said gain control terminal to fix the gain of said amplifier at a first level following said first instant, means coupled to the gas discharge means in the second of said parallel circuits for initiating conduction in the second of said parallel circuits, means coupling said circuits for extinguishing conduction in said first parallel circuit at said second instant, and a unilaterally conductive circuit connected to said second gain control terminal and adjustably connected to the resistance in said second parallel circuit for selectively applying a potential which is related to the potential taken from said first resistance inversely as said function at said second instant is related to the function at said first instant to change the level of said gain at said second instant inversely proportional to the change in said function in the interval between said instants.

5. A system for generating a cycle of a voltage of predetermined wave-form comprising gas discharge tubes each of which has an anode, a cathode and a control grid, capacitance means interconnecting the cathodes of said tubes to form a ring, a source of potential connected at its positive terminal to the anodes of said tubes and at a mid-point to a reference terminal, separate resistance means connecting the negative terminal of said source to the cathodes of each of said tubes, a D. C. path connected between a high potential point on each of said resistance means and the control grid of an adjacent tube, a source of pulses spaced uniformly in time coupled to the grids of all of said tubes for initiating conduction in one tube coincident with each said pulse and for extinguishing an adjacent tube by discharge of the capacitance means interconnecting the latter two tubes, high impedance circuit elements all connected to a common output point and each forming a separate path to a point of adjustable potential on said resistance means which differ with respect to said reference terminal as points equal in number to said tubes uniformly spaced one from another in said cycle of said wave-form differ from zero in sign and magnitude.

6. A system for generating a cyclic voltage of predetermined wave-form comprising gas discharge tubes each of which has an anode, a cathode and a control grid, capacitance means interconnecting the cathodes of said tubes to form a ring, a source of potential connected at its positive terminal to the anodes and at a mid-point to a reference terminal, separate resistance means connecting the negative terminal of said source to each of the cathodes of said tubes, a D. C. path connected between a high potential point on each of said resistance means and the control grid of an adjacent tube, means for initiating conduction in a first of said tubes, a source of pulses spaced uniformly in time coupled to the grids of all of said tubes for initiating conduction in the tube adjacent said first tube and in tubes successively positioned around said ring in response to said pulses, unidirectionally conductive circuit elements all connected to a common output point and each connected to resistance means in said cathode circuits at potential points differing with respect to said reference terminal as points uniformly spaced one from another in one cycle of said wave-form differ from zero in sign and in magnitude.

7. A gain control system for seismic exploration in which waves from detonation of an explosive charge are utilized to produce electrical signals for application to a recording means which includes a signal amplifier, which comprises a source of spaced timing pulses, a function generator having a source of potential, a plurality of electron tubes each having cathode circuit resistance means and each supplied by said source of potential, circuit means interconnecting said tubes for limiting instantaneous conduction from said source of potential in but one of said electron tube circuits, means for applying said pulses to all of said tubes for shifting conduction from one tube to another at a time rate dependent upon said pulses, and circuit means adjustably connected to said resistance means of all of said circuits and to said amplifier in a gain controlling relation for modifying the gain of said amplifier in dependence upon voltages produced across the adjustable portions of said resistance means.

8. A gain control system for seismic exploration in which waves from detonation of an explosive charge are utilized to produce electrical signals for application to a recording means which includes an amplifier, which comprises a source of spaced timing pulses, a function generator having a source of potential, a plurality of electron tubes each having cathode circuit resistance means and each supplied by said source of potential, circuit means interconnecting said tubes for limiting instantaneous conduction from said soure of potential in but one of said electron tube circuits, means operative in response to said detonation for applying said pulses to all of said tubes for shifting conduction from one tube to another following said detonation at a time rate dependent upon said pulses, and separate adjustable circuits connected between each of said resistance means and said amplifier in a gain controlling relation for modifying the gain of said amplifier in dependence upon voltages produced across the adjustable portions of said resistance means.

9. A gain control system for seismic exploration in which waves from detonation of an explosive charge are utilized to produce electrical signals for application to a recording means which includes an amplifier, which comprises a normally dormant source of spaced timing pulses, a function generator having a source of potential, a plurality of electron tubes each having cathode circuit resistance means and each supplied by said source of potential, circuit means interconnecting said tubes for limiting instantaneous conduction from said source of potential in but one of said electron tube circuits, means operative in timed relation to said detonation for energizing said source of pulses, circuit means for applying said pulses to all of said tubes for shifting conduction from one tube to another following said detonation at a time rate dependent upon said pulses, and a separate adjustable circuit connected between each of said resistance means and said amplifier in a gain controlling relation for modifying the gain of said amplifier in dependence upon voltages produced across the adjustable portions of said resistance means.

References Cited in the file of this patent
UNITED STATES PATENTS

| | | |
|---|---|---|
| 2,422,583 | Mumma | June 17, 1947 |
| 2,426,278 | Mumma | Aug. 26, 1947 |
| 2,454,782 | De Rosa | Nov. 30, 1948 |
| 2,457,819 | Hoeppner | Jan. 4, 1949 |
| 2,503,127 | Mumma | Apr. 4, 1950 |
| 2,510,989 | Lichtman et al. | June 13, 1950 |
| 2,535,043 | Cook | Dec. 26, 1950 |
| 2,648,835 | Rench | Aug. 11, 1953 |